Jan. 19, 1954 A. N. GEYER 2,666,333
BELT TENSIONING DEVICE
Filed Sept. 10, 1947
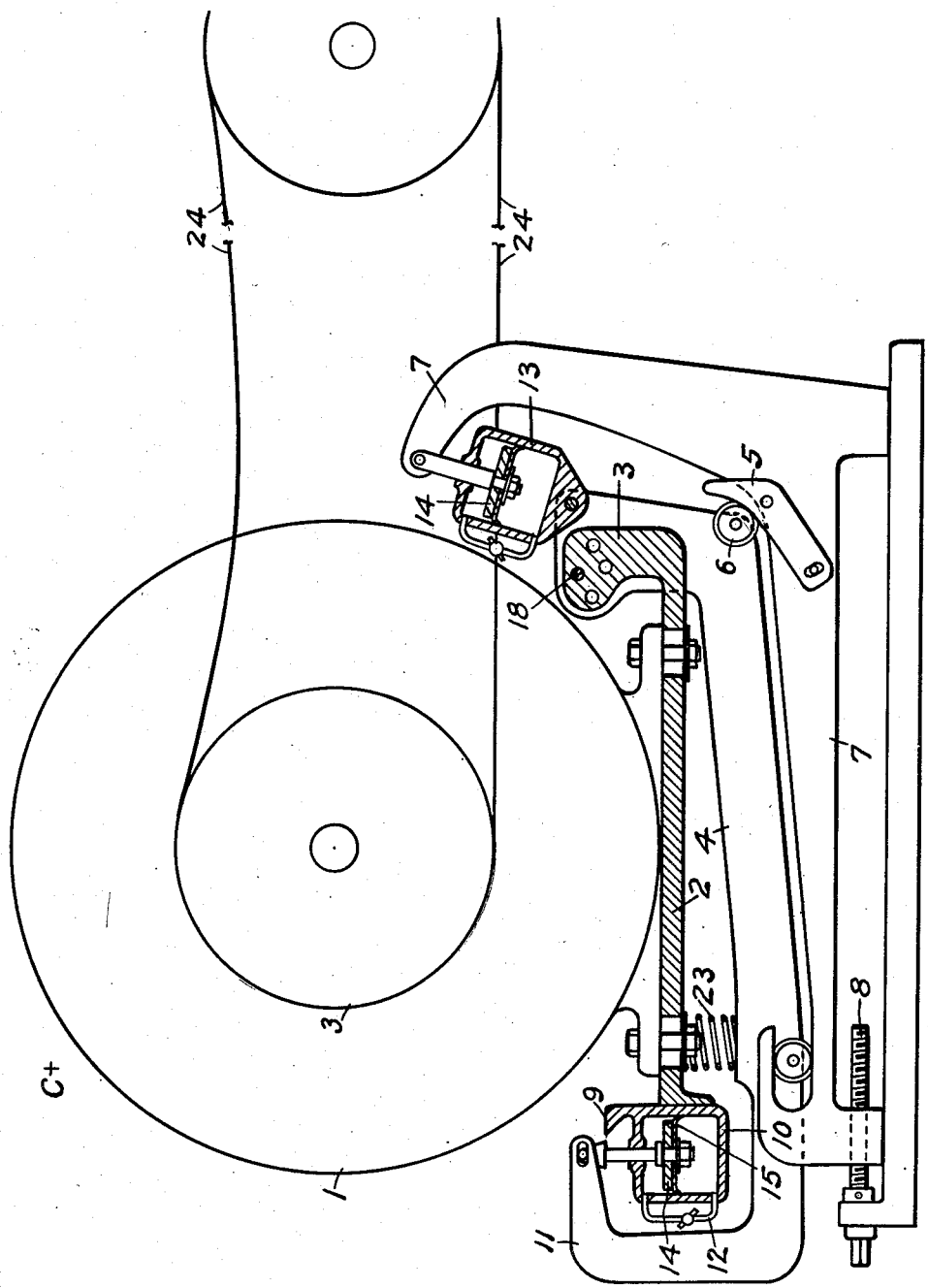
INVENTOR
Arthur N. Geyer
BY Fred C. Matheny
ATTORNEY Patented Jan. 19, 1954

2,666,333

UNITED STATES PATENT OFFICE 2,666,333

BELT TENSIONING DEVICE

Arthur N. Geyer, Seattle, Wash.

Application September 10, 1947, Serial No. 773,193

6 Claims. (Cl. 74—242.9)

My invention relates to improvements in devices for maintaining adequate belt tension by compensating for belt stretch and load transmitted, and is novel in being applicable to drives that must be reversed in direction of rotation.

Prior to this invention it has become common practice to use a single pivotal mounting for a pulley structure by which its weight and the torque of the load transmitted are effective in turning the pulley mounting about the eccentrically located pivot axis and thus farther from the other pulley in the drive, thus tightening the belt in starting and in heavy loads regularly transmitted. But when the direction of rotation is reversed, the result of the reversed twist of the load torque on the pivot mounting is to tend toward opposite pivotal movement of the pulley, i. e., toward the other pulley, thus loosening the belt instead.

It has been observed that so much trouble has been experienced by the belt coming off when it becomes necessary to back up the drive tensioned by such a pivoted motor, that extreme preventive measures may be taken, such as manually to turn up the slider screws of motor bases until the tightening belt pulls the motor support over extremely, even against the stop provided to limit such pivoting, in an effort to prevent the belt from becoming erroneously loosened in such reversals and thrown off, as often happens. The result of this is, of course, that the stop piece thus may prevent any loosening of the belt even when needed in changes in loading or in shrinkage, and thus the planned automatic tensioning is defeated.

It is an object of this invention to make use of the benefits of pivotal mountings by supplying a combination comprising one for each direction of rotation and to provide selective action in the interconnection to employ the one needed for definite tensioning of the belt running in a certain direction.

An object is to provide an adjustable base to accommodate pulley mountings of different sizes and to locate the pulley in proper relation to the pivot axis to effect the desired degree of tension in the belt drive.

Another object is to enable use of pulley mountings embodying these improvements as supporting either the driving or the driven pulley.

An object is to provide a belt tensioning device for use wherever it is important to have the manually adjusted base screws accessible outside and away from the belt run regardless of the direction of rotation required by the job.

In actual practice this improved pulley mounting plainly will be more compact than what is indicated by the schematic drawing, by being designed considerably underslung in conjunction with a higher pivot axis, raising also the roller mounting and whole base below, and locating dashpots lower down, as in the base, and with inconspicuous interconnections, although accessible for ready inspection and care.

Oil filled dashpots need not necessarily be employed, the duties being filled by other well known means.

While I have here shown and described one embodiment of my invention, it is to be understood that many changes can be made therein, such as are appended in the claims, without departing from either the scope or the spirit of the invention.

The accompanying drawing which forms a part of this specification is a schematic showing of the mountings for a pulley structure, here represented by a pulley-carrying electric motor 1 with belting 24 toward load and adjustably mounted in a familiar manner on pivot base 2, with hinged end 3 attached to subbase 4 below, this in turn being supported on flanged wheels or rollers 6 resting on tracks parallel with the plane of the belt loop, under hinged end curving upward in adjustable portion 5 and more nearly flat under the other end. As represented there with parts in equilibrium in a typical operating position, it is readily seen that the motor weight overhanging the pivot 18 tends to separate the pulleys in the drive, for adequate tensioning of the belt, and to maintain this by compensating for belt stretch or shrinkage; that reaction torque from motor or belt drive acting in the counterclockwise direction when the pull is on the lower lap of the belt 24 will be additive to the motor weight on the hinged base to compress the spring 23 beneath and increase belt tension under the higher loads; also that the side pull on the belt on the structure is transmitted through the pivot 18 to the subbase 4 and to the supporting wheel 6 which is thus held partly up its curved track 5 in the equilibrium situation shown.

In completing support provisions the tracks are mounted on the familiar sliding base 7 provided with adequate adjusting screw 8 by which the usual tightening may be done after the drive belt connection is made. It is readily seen that this regular starting operation of adjusting screw promptly will move the sliding base with curving track farther under the roller with increasing lifting and horizontal action, pressing the pulley into the belt loop until the reaction about the pivot adds to the spring force to raise the motor progressively to the usual level position specifically as shown by registry of position indicator 9 above dashpot 10.

For operating interconnection between the pivoted base 2 and the roller mounted subbase 4, there is shown attached to the pivoting end the body of a liquid filled biased dashpot 10 adapted to be predominantly single acting, as by providing under its loose fitting piston 14 a cup leather 15 curving downward, that seals tight only under pressure below in upswing, in effect locking piston to rising cylinder. Thus the dashpot 10 provides biased resistance which strongly opposes upward movement of the adjacent end of the pivot base 2 while allowing free downward movement of the same. This serves to oppose free upward swing of pivot base at any time, since the piston rod is pinned to an extension 11 of subbase 4. Thus this locking requires that any clockwise twist be transmitted to the subbase as well, producing a rolling movement of the subbase. Although this subbase is shown to have on its other end a dashpot interconnection to the substantially fixed lower base support 7 there is practically no opposition to such rolling clockwise because of the biased piston action here also. Hence every clockwise twist is communicated to the roller base. And since the tracks are curved and eccentric with respect to the pulley center, as constructed in the drawing, with immediate center at point C located opposite the pivot 18 it is seen that any strong torque effect from motor or belt running in the reverse direction so that the tension is on the upper lap of the belt 24 is thus utilized to twist the upper mounted parts clockwise about point C to increase belt tension.

In further consideration of the dashpots, there is provided an adjustable bypass 12 to modify its one-way action by allowing a little slippage through adjustment of bypass valve to bring about needed timing in operations. The application of this may best be brought out by considering this belt drive arrangement in operation, first merely as running as shown in the forward direction with the tension on the lower lap of the belt 24, then as there come greater load and reaction torque the pivoted motor base swings down promptly without undue hindrance in its biased dashpot 10, the oil flowing freely enough down around the loose fitting piston 14 and cup leather 15 to effect only restraint from jumpy action, and thus the tilting motor may increase belt tension as needed. While this greater side force communicated to pivot 18 and to roller 6 below, plainly will tend to shift this farther up the sloping track, this in any rapid manner is prevented by the one-way opposition of the substantially fixed piston of dashpot 13 as the rising oil is trapped to lock the parts and thus to hold the subbase position. Then a slow bypassing may follow, equilibrium is soon reached with the roller in the more sloping range, and things are right to continue the automatic belt tensioning by pivoting as needed for any greater or lesser load transmitted. Then when there is a letup in the load and thus in the forward torque, bypass action in the pivot base dashpot 10 will let the belt tension ease off to complete the automatic tensioning.

For more extreme operations, consider these provisions in very troublesome situations, experienced especially where the driven machine becomes clogged and must be reversed to be freed for further running. The resulting reaction torque in twisting the motor frame clockwise now transmits through the locked dashpot 10, just as previously described, a strong turning effect about C, twisting parts without undue hindrance from subbase dashpot 13 as its body is lowered, and thus good belt tension is maintained to clear out the machine. Then with the next forward switching, the resulting counterclockwise movement is prevented from being extended to the subbase 4, such as might take out the belt-tightening effect last put in, by the opposition put up by dashpot 13 against any quick reversed movement of subbase 4, hence the aforesaid forward operation may control pivoting as usual, as has been treated in detail. And when there comes a reduction in this forward loading and reaction torque the belt tension is suitably eased through yielding bypass action.

Due to this double provision of swing mountings and the selective action of the interconnecting dashpots, it is readily seen that operation of a pulley structure of this kind to drive in either direction produces automatic tensioning of the belt varying with the load transmitted. The member 1, shown in the drawings, may be either a motor or a generator and is herein referred to as an electrical machine.

Plural pivot holes allow use of pivot 18 on different levels to suit pulley structures of various heights, and thus in conjunction with the adjustable side position of mounting on pivot base, to get best relation of pulley to pivot.

Spring 23 under the dashpot end of pivoting base may be adapted to prevent undue toggle action with a belt run closely in line with pivot point.

While I have here shown and described one embodiment of my invention, it is to be understood that many changes can be made therein such as are appended in the claims, without departing from either the scope or the spirit of the invention.

I claim:

1. In a belt tensioning device, the combination of a sliding base provided with an adjusting screw, a subbase having rollers thereon for rolling contact with said sliding base, a pivot base pivotally mounted at one end on the subbase, a cushion spring and a dashpot between the other end of the pivot base and the subbase, a dashpot between the subbase and said sliding base, a motor adjustably mounted on the pivot base, and a driving pulley on the motor shaft.

2. In a belt tensioning device, the combination of a base frame, a subbase, rolling contact means supporting said subbase on said base frame providing angular movement of said subbase; a pivot base having one end portion pivotally supported from said subbase, a biased dashpot operatively connected between the pivoted end portion of said subbase and said base frame restraining rapid upward movement of the pivotally connected end portions of the subbase and pivot base, another biased dashpot operatively connected between the other end portion of said pivot base and said base frame restraining rapid upward movement of the non-pivoted end portion of the pivot base, a shaft rotatively mounted on said pivot base, and a pulley carried by said shaft adapted to operate in a belt, whereby reaction to torque in either direction transmitted through said pulley will tend to draw the pulley more tightly into the belt.

3. In a belt tensioning device, the combination of a base frame, a subbase, rolling contact means supporting said subbase on said base frame providing angular movement of said subbase on said base frame, a pivot base having one end portion pivotally supported from said subbase, a biased dashpot operatively connected between the other end portion of said pivot base and said base frame restraining rapid upward movement of said other end portion of said pivot base; a shaft rotatively mounted on said pivot base, and a pulley carried by said shaft adapted to operate in a belt, whereby reaction to torque in either direction transmitted through said pulley will draw the pulley more tightly into the belt.

4. In a belt tensioning device, the combination of a support means, a pivot base having one end portion pivotally supported from said support means, an electrical machine adjustably supported on said pivot base and having a shaft carrying a pulley operating in a belt under an initial belt tension, whereby reaction to torque in one direction transmitted through the pulley will draw the pulley more tightly into the belt and reaction to torque in a reverse direction transmitted through the pulley will tend to move the pulley in a belt loosening direction; and a biased dashpot comprising a liquid filled cylinder and a piston operatively connected between the non-pivoted end portion of said pivot base and said support means, the connection of said cylinder and piston providing compression of trapped liquid resisting belt loosening movement of the pivot base and holding said pivot base substantially fixed against rapid belt loosening movement when the direction of torque applied through the pulley is reversed.

5. In belt tightening devices, the combination of a support means, a pivot base pivotally supported from said support means, a shaft rotatively mounted on said pivot base with its axis transversely offset relative to the mounting pivot of the pivot base, whereby initial belt tensioning is provided, a pulley carried by said shaft adapted to operate in a belt, whereby reaction to torque exerted in one direction through said pulley will tend to pivotally move said pivot base and draw the pulley more tightly into the belt, and biased liquid compression resistance means operatively connected between said support means and said pivot base and adapted in the interconnection for allowance of substantially unopposed relative movement of said pivot base and said base frame in belt tightening effect under running conditions in one direction and for substantial holding of relative position of said pivot base and support means through compression resistance of trapped liquid in said biased resistance means immediately upon reversal of direction of drive.

6. In belt tensioning devices, the combination of a pivot base, an electrical machine supported on said pivot base and having a shaft carrying a pulley to receive a torque transmitting belt, a subbase, pivot means at one side of the electrical machine mounting said pivot base on said subbase, a base frame, rolling contact means supporting said subbase on said base frame providing movement of said subbase substantially about a center which is on the opposite side of the electrical machine shaft from the pivot of said pivot frame, biased resistance means operatively connected with said pivot base restraining rapid upward movement of the non-pivoted end portion of said pivot base, and other biased resistance means operatively connected with said subbase restraining rapid upward movement of the pivoted end portion of said pivot base, whereby increase of belt torque in either angular direction provides belt tightening.

ARTHUR N. GEYER.

References Cited in the file of this patent
UNITED STATES PATENTS

| Number | Name | Date |
|---|---|---|
| 1,960,506 | Pfleger | May 29, 1934 |
| 1,982,682 | Masse | Dec. 4, 1934 |
| 2,125,004 | Hamerstadt | July 26, 1938 |

FOREIGN PATENTS

| Number | Country | Date |
|---|---|---|
| 197,965 | Great Britain | Aug. 21, 1924 |